United States Patent [19]

Hartranft et al.

[11] 4,319,182

[45] Mar. 9, 1982

[54] ALTERNATING POLARITY POWER SUPPLY CONTROL APPARATUS

[75] Inventors: Marc D. Hartranft, Brooklyn Park; Thomas E. Hendrickson, Wayzata, both of Minn.

[73] Assignee: Honeywell Inc., Minneapolis, Minn.

[21] Appl. No.: 141,512

[22] Filed: Apr. 18, 1980

[51] Int. Cl.³ .............................................. G05F 5/00
[52] U.S. Cl. .................................... 323/319; 307/584
[58] Field of Search ............... 323/235, 239, 319, 324; 307/354, 279, 511, 584

[56] References Cited

U.S. PATENT DOCUMENTS

| 4,256,977 | 3/1981 | Henrickson et al. | 307/279 |
| 4,256,978 | 3/1981 | Pinckaers | 307/279 |
| 4,256,979 | 3/1981 | Henrickson et al. | 307/279 |
| 4,258,276 | 3/1981 | Beling | 323/319 |

Primary Examiner—William H. Beha, Jr.
Attorney, Agent, or Firm—Theodore F. Neils

[57] ABSTRACT

Electronic switching circuit is provided for controlling transfer of electrical power from an alternating polarity electrical power supply to a load means through use of a field-effect transistor device as the controlling element. A circuit arrangement is provided for switching into the "on" condition primary power control field-effect transistor device only when the voltage thereacross is at a relatively low value and for switching into the "off" condition this device in a gradual manner, relatively slowly reducing currents flowing therethrough. A circuit arrangement for a command source directing operation of the primary power transfer control field-effect transistor device provides command source isolation.

23 Claims, 3 Drawing Figures

ALTERNATING POLARITY POWER SUPPLY CONTROL APPARATUS

Reference is hereby made to earlier filed copending applications by L. H. Buckendorf, et al., entitled "Alternating Polarity Power Supply Control Apparatus" having Serial No. 116,052, by T. E. Hendrickson entitled "Alternating Polarity Power Supply Control Apparatus" having Ser. No. 973,215, now U.S. Pat. No. 4,256,977 issued Mar. 17, 1981, by T. E. Hendrickson, et al., entitled "Alternating Polarity Power Supply Control Apparatus" having Ser. No. 973,463, now U.S. Pat. No. 4,256,979 issued Mar. 17, 1981, and by T. E. Hendrickson, et al., entitled "Semiconductor Apparatus" having Ser. No. 24,840. Each of these copending applications are assigned to the same assignee as is the present application.

BACKGROUND OF THE INVENTION

The present invention is related to circuits in which a field-effect transistor device controls power transfers from an alternating polarity electrical supply to a load means, particularly when such field-effect transistor devices are capable of being integrated into monolithic integrated circuits.

Various solid state devices have been used in circuits as the primary means for controlling power transfer from an alternating polarity electrical power supply to whatever kind of load means is of interest for use in the circuit. Noting the four above-referenced applications, one of the applications discloses such field-effect transistor devices as are suitable to be used as the primary means for controlling power transfers from an alternating polarity electrical power supply to such loads, and the other three applications show various circuit means for use in conjunction with such field-effect transistor devices to direct operation of these devices. As set out therein, the field-effect transistor device is a device which can provide symmetrical, bidirectional current conducting capability for use in alternating polarity power supply circuits. Particularly useful are devices which are effectively insulated-gate field-effect transistors (IGFET's), often metal-oxide-semiconductor field-effect transistors (MOSFET's), which have the further advantage of having the gate or control regions therein very well isolated from the remaining portions of the device including the channel region and the terminating regions at the ends of the channel region.

Such electrical isolation between the gate or control region, of an IGFET device and its remaining portions aids in providing a control circuit having as its purpose the directing of the operation of this transistor device. This isolation is particularly helpful when the control circuits and the transistor device are formed in a monolithic integrated circuit chip because a difficult control problem can arise when the power supplied to the integrated circuit is from an alternating polarity power supply. Such monolithic integrated circuit configurations must provide for the operation of the primary power transfer control IGFET device and the control of power transfers from the alternating polarity power supply to the load, while also providing for operation of other circuit components further provided in the monolithic integrated circuit chip.

As is well known, electronic component device theory shows that field-effect transistors are operated by controlling the voltage appearing between the gate thereof and the connection to that one of the two channel terminating regions therein which is effectively serving as a transistor source. Difficulties arise in those circuits using a field-effect transistor to control power transfers from an alternating polarity power supply to a load means because the two connections to the channel region of such a device serve alternately as source connections rather than one of them serving continually as the source connection.

FIG. 1 shows an abbreviated version of a circuit disclosed in the control circuit application referenced above having Ser. No. 973,215. This circuit uses what is effectively an enhancement mode, p-channel, IGFET, 10, for controlling power transfers from alternating polarity electrical power supply, 11, to a load means, 12, or alternatively, to a load means, 12', shown in dashed lines. Device 10 can be a device of the nature disclosed in the application referenced above having Ser. No. 24,840.

Field-effect transistor 10, being a p-channel IGFET, is provided in and on a substrate, 13, of a semiconductor material, typically silicon, which is doped, except in selected regions, to be of n-type conductivity. The channel connection or terminating regions, 15 and 16, which terminate the ends of the channel region (when a channel is induced) in transistor 10, are formed by diffusion or implantation of p-type conductivity impurities in the substrate material. Channel regions 15 and 16 can alternately serve as source and drain depending upon which is currently positive with respect to the other during operation. Parasitic diodes are formed in the structure of transistor 10 by the semiconductor pn junctions occurring between regions 15 and 16, on the one hand, and the remaining substrate material of transistor 10 on the other. These diodes are designated 17 and 18 in FIG. 1 and are shown in short dashed-line form to indicate that these are parasitics.

Also associated with these pn junctions but not shown are a number of other parasitic capacitances and parasitic resistances. All of these further parasitic components will have more or less of an effect on the operating behavior of transistor 10, and so in the behavior of the circuit in which transistor 10 is provided. The significance of the effects depends on the conditions existing in such a circuit and the values of the parasitic components. These parasitic components are shown in lumped form in the first three applications referenced above, but since dealing with these parasitic capacitances in the circuit is not a primary purpose of the various means disclosed in the present application, they have not been shown in FIG. 1 beyond showing of an effective lump parasitic capacitance, 24, between substrate 13 and gate 14 of transistor 10. Gate 14 is isolated from the substrate material of transistor 10 by an insulating layer.

At sufficiently low frequencies, the various parasitic capacitances indicated to be associated with transistor 10 of FIG. 1 will not be significant factors in the operation of the circuit of this figure. At higher frequencies, these capacitances must be taken into account in the circuit operation and, where detrimental, means must be provided for obviating the effects thereof. Such means are shown in the applications referenced above having Ser. Nos. 116,052 and 973,463 and are shown again, at least in part, in other figures of the present application. Also, the leakage resistances associated with transistor 10 are usually sufficiently large so that they will not be significant in the operation of this circuit.

Further, note that load means 12 could also have a reactance component thereto, but this has not been shown, and load means 12 will be described as being resistive for ease of understanding an exposition. This is also true of the alternative load means 12, that is, load means 12'. Load means 12' can be used in place of load means 12 with similar operating results in the circuit of FIG. 1 because of the symmetry inherent therein. For the following description, reference will be made only to load 12.

The primary control circuit portion for FIG. 1 is shown electrically connected between gate 4 and substrate 13 of transistor 10. This primary control circuit includes a constant polarity voltage source, 8, and a switch, 9. In the first position of switch 9, gate 14 of transistor 10 is directly electrically connected to substrate 13 of transistor 10, and constant polarity voltage source 8 is disconnected at the negative side thereof from the remaining portions of the circuit of FIG. 1. In these circumstances, supply 11 will alternately cause one of terminating regions 15 or 16 to be positive with respect to the other, and the terminating region then positive will be serving at that time as a source for transistor 10. Further, substrate 13 will not be more than a pn junction voltage drop less in voltage than whichever of terminating regions 15 and 16 is serving as the source because of the presence of parasitic diodes 17 and 18. As a result, the voltage between gate 14 and whichever of terminating regions 15 and 16 is serving as a source will be approximately the value of the voltage drop occurring across one of parasitic diodes 17 or 18 which will be substantially less than the threshold voltage of transistor 10. Device theory indicates that transistor 10 in these circumstances will be in the "off" condition.

In the other condition of switch 9, constant polarity voltage source 8 is in the circuit with its negative side connected to gate region 14 of transistor 10 and its positive side connected to substrate 13 of transistor 10. Effective capacitance 24 will then be charged by constant polarity voltage source 8 until the voltage thereacross is equal to the output voltage of source 8. With supply 11 again supplying an alternating voltage such that terminating regions 15 and 16 are alternately serving as the source for transistor 10, the source of transistor 10 will be no more than the voltage drop across one or the other of parasitic diodes 17 or 18 above the voltage at substrate 13. Hence, gate 14 will be negative with respect to whichever of the terminating regions is currently serving as a source. Assuming that the output voltage of source 8 is greater than the threshold voltage of transistor 10, device theory indicates that in these circumstances transistor 10 will then be switched into the "on" condition thereby permitting transfer of electrical power from alternating polarity power supply 11 to load means 12.

Since the setting of the position of switch 9 in practice will be entirely uncoordinated with the polarity and output voltage magnitude of alternating voltage supply 11, one can expect quite often that switch 9 will have its position changed to direct transistor 10 to switch from the "off" condition to the "on" condition at times when the voltage appearing between terminating regions 15 and 16 of transistor 10 is near its maximum value. Since capacitance 24 is of a quite small value, voltage source 8 will charge capacitance 24 extremely rapidly so that transistor 10 switches into the "on" condition quite abruptly thereby permitting very large currents to flow therethrough. Similarly, the position of switch 9 will often change to direct transistor 10 to switch from the "on" to the "off" condition at times when the current flow occurring through transistor 10 is very near its maximum value. Again, because capacitance 24 has a small value, capacitance 24 will rapidly discharge through switch 9 so that transistor 10 switches into the "off" condition quite abruptly leading to a sudden drop in the value of current flowing therethrough. Rates of change in current flow in these circumstances can be further affected by the presence of capacitive or inductive components in load 12.

As electromagnetic theory indicates, abrupt changes in current amplitude lead to electromagnetic radiation emanating from the circuit in which these changes occur. Such electromagnetic radiation can interfere with the performance and operation of other electronic systems sufficiently nearby. Further, abrupt changes in current amplitude can lead to electrical noise or transients being coupled to supply 11 and any other circuits or systems directly sharing supply 11. Thus, desirable operation of transistor 10 in FIG. 1 in switching from the "on" condition to the "off" condition, and vice versa, would be such as to prevent large current value changes at least in those situations where electromagnetic interference would be detrimental to the operation of nearby or electrically connected electronic systems.

As is well known, one method of reducing such electromagnetic interference is to prevent abrupt current level changes through switching primary power transfer controlling devices, such as transistor 10, from the "on" condition to the "off" condition, and vice versa, only when the voltage across such a device or the current through such a device is near its minimum value. Such switching can be difficult to achieve because electronic devices usually require at least some minimum voltage or current before they can respond to input commands. Further, providing such switching control in the same monolithic integrated circuit chip containing the primary power transfer control device is desirable but difficult to achieve when the chip is to be supplied alternating polarity electrical power.

SUMMARY OF THE INVENTION

The invention provides a circuit with a field-effect transistor device which can be used in controlling power transfers between an alternating polarity power supply and a load means, with this supply and load, in operation, connected on either side of the device channel. A circuit arrangement is provided for switching into the "on" condition the primary power control field-effect transistor device only when the voltage thereacross is at a relatively low value and for switching into the "off" condition this device in a gradual manner, relatively slowly reducing currents flowing therethrough. This is accomplished, in the first instance, by monitoring the voltage occurring between the terminating regions of the primary power transfer control field-effect transistor device and, in the second instance, by reducing the voltage appearing between the gate and substrate of this device in a relatively slow manner. A circuit arrangement for a command source directing operation of the primary power transfer control field-effect transistor device can be used which isolates the command source thus preventing interaction with the foregoing circuit arrangements used in controlling the switching of the field-effect transistor device.

DESCRIPTION OF THE PREFERRED EMBODIMENTS

Figure 1:
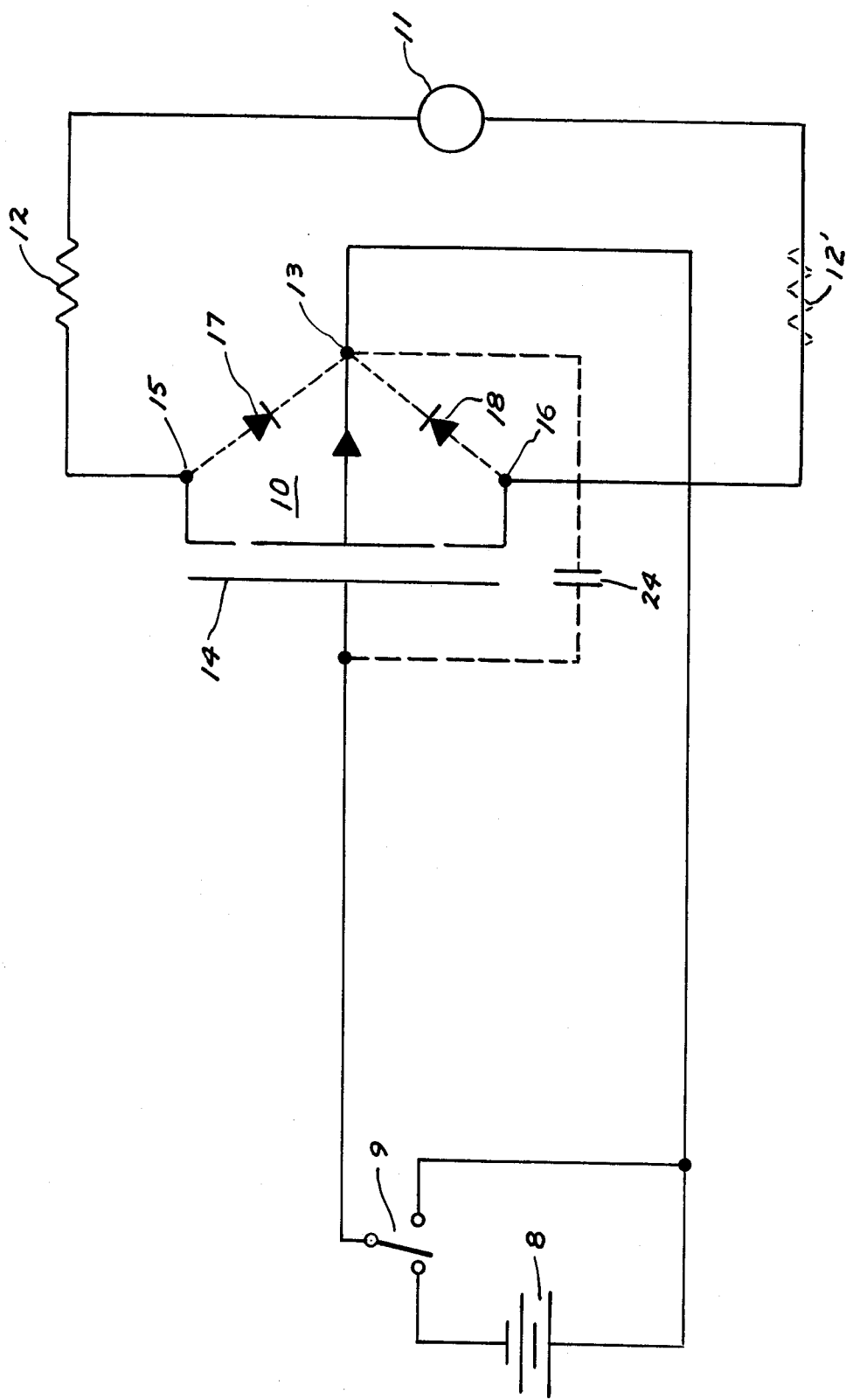
FIG. 1 shows a schematic diagram of a kind of circuit for controlling power transfers from an alternating polarity electrical power supply to a load means.
Figure 2:
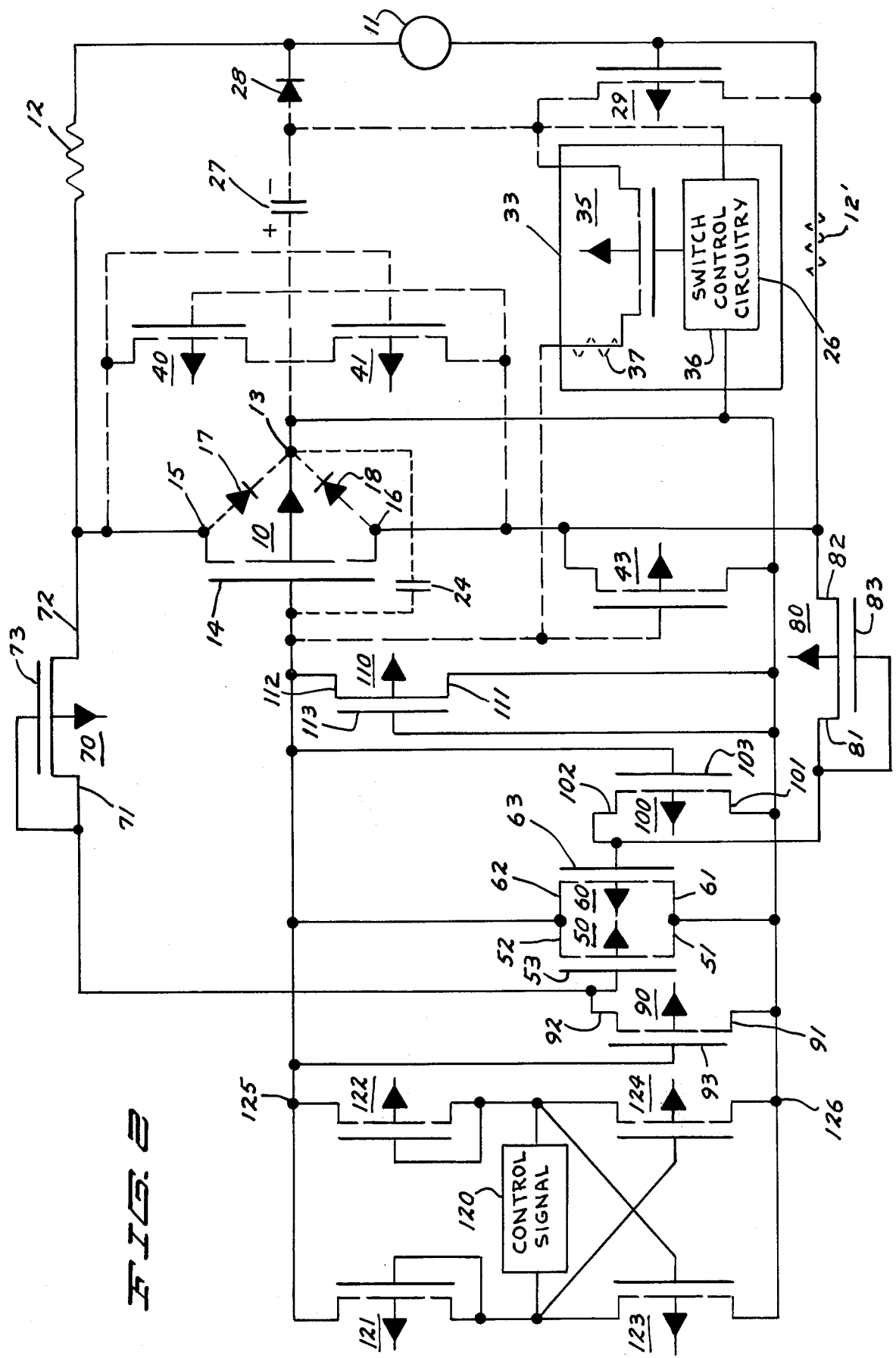
FIG. 2 shows an embodiment of the circuit of the invention in schematic diagram form to be used for the same purpose.

FIG. 2 shows an improved version of the circuit of FIG. 1 and presents a substitution for constant polarity voltage source 8 and switch means 9 of FIG. 1. Where pertinent, the same designations have been retained in FIG. 2 as are used for corresponding components appearing in FIG. 1.

In FIG. 2, alternating polarity voltage supply 11 in series with load means 12 is again provided on either side of transistor 10, this series combination being connected to terminating region 15 on one side of transistor 10 and to terminating region 16 on the other side. All of the parasitic circuit elements shown or known to be associated with transistor 10 in FIG. 1 are again shown in FIG. 2, and those shown are again provided in short dashed line circuits to indicate the elements are parasitic. Thus, transistor 10 in FIG. 2 is again contemplated to be a device such as that disclosed in the patent application referenced above having Ser. No. 24,840.

Also, an alternative location for load 12 is shown by dashed line load 12'. Although it will essentially apply to load 12', the following description will be based on load 12. Either of loads 12 or 12' could also have a reactive component associated therewith, but only a resistive component is shown and described for ease of exposition and understanding.

Constant polarity voltage source 8 and switch means 9 of FIG. 1 have been replaced in FIG. 2 by a control signal source arrangement containing a control signal generating means, 120, which may provide either constant polarity or alternating polarity command signals between its output regions or terminals. Such signals are provided between these output terminals at the desire of the generating means operator to provide the operator's commands to the system shown in FIG. 2. Control signal generating means, 120, is assumed herein to have an internal impedance which will limit the current flow out of the control signal source arrangement or means. However, an impedance external to generating means 120 or external to the entire control signal source means could be used for this purpose.

The control signal source means has two output regions or terminals, 125 and 126, by which it is connected to direct operation of transistor 10 in permitting or blocking transfer of power from supply 11 to load means 12. Terminal 125 is connected directly to gate 14 of transistor 10 while terminal 126 is directly electrically connected to the substrate 13 of transistor 10.

Between terminal 125 and the output terminals of control signal generating means 120 are two effective diode means, 121 and 122, each of which serves to substantially limit current flow to being in only one direction therethrough. Means 121 and 122 are shown provided, however, by enhancement mode, p-channel IGFET's each of which has a terminating region thereof, at one end of the channel region therein, electrically connected to control source signal means output region 125. Transistor 121 has the remaining terminating region therein, at the other end of the channel region, and its gate region electrically connected to the output terminal of control signal generating means 120. Similarly, the remaining terminating region in transistor 122 and the gate region thereof are connected to the other output terminal of control signal generating means 120. Ordinary semiconductor diodes could be used in place of transistors 121 and 122.

Two switching means, 123 and 124, are connected between control signal source means output region 126 and the output terminals of control signal generating means 120. Switching means 123 and 124 are each enhancement mode, p-channel IGFET's and each has a terminating region thereof, at one end of the channel region therein, electrically connected to control signal source output terminal 126. The remaining terminating region in transistor 123, at the other end of the channel region therein, is connected to the output region of control signal generating means 120 to which transistor 121 is connected. The gate region of transistor 123 is connected to the opposite output region of control signal generating means 120. Similarly, but reversed, the gate region of transistor 124 is connected to the output region of control signal generating means 120 to which transistor 121 is electrically connected while the terminating region remaining in transistor 124 is connected to the opposite output region of control signal generating means 120.

As will be described below, a signal voltage at the output terminals of control signal generating means 120, of either constant or alternating polarity, will lead to terminal 126 of the control signal source means being positive with respect to terminal 125 thereof to thereby switch transistor 10 into the "on" condition. On the other hand, the absence of a signal between the output terminals of control signal generating means 120 will cause terminals 125 and 126 to appear to be an open circuit with respect to each other irrespective of whether a positive test voltage was applied to terminal 125 or terminal 126 with respect to the other terminal.

A zero range monitor switch arrangement is connected between gate region 14 of transistor 10 and substrate 13 thereof comprising two enhancement mode, p-channel IGFET's, 50 and 60. The terminating regions, 51 and 61, in each of transistors 50 and 60, respectively, serving as the source regions therefor are electrically connected to one another and to substrate 13 of transistor 10. The terminating regions, 52 and 62, in each of transistors 50 and 60, respectively, serving as the drain regions therefor are electrically connected to one another and to gate region 14 of transistor 10.

Transistor 50 has a gate region, 53, which is electrically connected to terminating region 15 of transistor 10 through a depletion mode, p-channel IGFET, 70. Transistor 70 has a terminating region, 72, at one end of the channel region therein, electrically connected to terminating region 15 of transistor 10. Transistor 70 has a gate region, 73, and the remaining terminating region, 71, at the other end of the channel region therein, electrically connected to gate region 53 of transistor 50. Similarly, transistor 60 has a gate region, 63, electrically connected to terminating region 16 of transistor 10 through a depletion mode, p-channel IGFET, 80. Transistor 80 has a terminating region, 82, at one end of the channel region therein, electrically connected to terminating region 16 of transistor 10. The gate region, 83, and the remaining terminating region, 81, at the other end of the channel region in transistor 80 are both electrically connected to gate region 63 of transistor 60.

Ignoring any other effects which may be due to other electrical components connected to the circuit arrangements so far described, neither transistor 50 nor 60 will switch into the "on" condition unless the voltage applied to the gate region thereof occurring at the terminating regions of transistor 10 exceeds the threshold voltage of either of transistors 50 and 60. As a result, each of transistors 50 and 60 serve as a threshold switch means such that one of these transistors is switched into the "on" condition when the voltage occurring between terminating regions 15 and 16 of transistor 10, or the voltage between the substrate 13 of transistor 10 and whichever terminating region, 15 or 16, is more negative, is in excess of the threshold voltage of one of transistors 50 or 60. With either of transistors 50 or 60 switched into the on condition, gate region 14 of transistor 10 will be effectively shorted to substrate 13 thereof preventing any voltage signal occurring between terminals 125 and 126 of the control signal source means from switching transistor 10 into the "on" condition.

Thus, transistors 50 and 60 serve as to confine the range of output voltage of alternating polarity supply 11 during which transistor 10 can be switched "on", the range being when the voltage between the positive and negative terminals of supply 11, i.e. between channel terminating regions 15 and 16 of transistor 10, is less than the threshold voltage of whichever of transistors 50 and 60 has the gate thereof connected to the negative terminating region of transistor 10 as is determined by the negative side of supply 11 such that this transistor is switched into the "off" condition, the other transistor also being "off" because of the gate thereof being connected to the positive terminating region of transistor 10. This means that only a very small voltage appearing between terminating regions 15 and 16 of transistor 10 whenever it is switched into the "on" condition thus meaning that a relatively small current flow therethrough will initially follow the switching of transistor 10 into such an "on" condition. Transistors 70 and 80, being depletion mode devices each having a gate thereof connected to a source thereof, will operate, if lower voltages are applied thereacross substantially as a resistance, and for higher applied voltages will operate substantially as a current sink and limit any current flow therethrough and will not otherwise affect the aforedescribed operation.

When transistor 10 is in the "on" condition, only a very small voltage appears between terminating regions 15 and 16 thereof and between them and substrate 13. Such a voltage will be less than the threshold voltages of transistors 50 and 60 so that transistors 50 and 60 will remain in the "off" condition during times when transistor 10 is in the "on" condition.

Dropping the assumption that there are no other circuit components affecting the zero range monitor switch, two enhancement mode, p-channel, IGFET's, 90 and 100, are connected to the gates of transistors 50 and 60 serving as threshold switch devices in the zero range monitor switch. Transistor 90 has a terminating region, 91, serving as the source thereof and is electrically connected to substrate 13 of transistor 10. The other terminating region, 92, of transistor 90, serving as the drain, is electrically connected to gate 53 of transistor 50. The gate region, 93, of transistor 90, is electrically connected to gate region 14 of transistor 10. Similarly, transistor 100 has a terminating region, 101, serving as a source thereof and is electrically connected to substrate 13 of transistor 10. The remaining terminating region, 102, of transistor 100, serving as the drain, is electrically connected to gate 63 of transistor 60. The gate region, 103, of transistor 100 is electrically connected to gate region 14 of transistor 10. In this arrangement, a voltage occurring between gate region 14 and substrate 13 of transistor 10 greater than the threshold voltage of either of transistors 90 or 100 will cause that transistor having its threshold voltage so exceeded to be in the "on" condition. In this situation, the associated transistor in the zero range monitor switch will be forced into the "off" condition, that is, transistor 90 can control threshold switch device transistor 50 and transistor 100 can control threshold switch device transistor 60. The result is that transistors 90 and 100 can prevent transistor 50 and 60 respectively from being switched into the "on" condition whenever a voltage occurring between gate region 14 and substrate 13 exceeds the threshold voltages of transistors 90 and 100.

The voltage occurring between gate region 14 of transistor 10 and substrate 13 thereof can be controlled by the voltage provided by control signal generating means 120 which presents a voltage at output terminals 125 and 126 of the control source means, as earlier indicated, but can also be affected through the presence of another depletion mode, p-channel IGFET, 110. Transistor 110 has a terminating region, 111, serving as the source thereof, electrically connected to substrate 13 of transistor 10. Gate region, 113, of transistor 110 is also electrically connected to substrate 13. The remaining terminating region, 112, of transistor 110, serving as the drain thereof, is electrically connected to gate region 14 of transistor 10. As earlier indicated, a depletion mode transistor having its gate region connected to its source region operates substantially as a resistance when relatively low voltages are applied between drain and source. For larger applied voltages, a depletion mode transistor so connected operates substantially as a current sink. The point at which the applied voltage between the drain and source of such a transistor causes a change from operation as a resistance to operation as a current sink is known in the art as the "pinch off" voltage. The value of the resistance represented by a depletion mode device for voltages between the source and drain less than the pinch off voltage and the value of the current sink for voltages between the source and drain higher than the pinch off voltage in the arrangement shown for transistor 110 in FIG. 2 are to a considerable extent in the control of the device designer.

Transistor 110 affects the voltage appearing between gate 14 of transistor 10 and substrate 13 thereof by serving as a discharge means for the voltage which occurs across capacitance 24. Capacitance 24 will be charged by the application of a command signal voltage between terminals 125 and 126 from the control signal source means due to signals appearing at the output terminals of control signal generating means 120. The capability of the control signal source means to supply sufficient current through terminals 125 and 126 to supply a current greater than the current value of the current sink established by transistor 110 will lead to capacitance 24 being charged by command signals from control signal generating means, 120, appearing at terminals 125 and 126. When such command signals are no longer present at terminals 125 and 126, i.e. insufficient current, capacitance 24 will immediately begin discharging through transistor 110 and therefore the resulting voltage between gate region 14 of transistor 10 and substrate 13, in the absence of sufficient command signals provided at terminals 125 and 126, will depend on the amount of discharging of capacitance 24 permitted by transistor 110. For voltages remaining between gate 14 and substrate 13 of transistor 10 in excess of a pinch off voltage of transistor 110, the discharge of capacitance 24 will be essentially linear as determined by the current source behavior of transistor 110. For voltages between gate 14 and substrate 13 less than the pinch off voltage of transistor 110, capacitance 24 will discharge exponentially through the effective resistance of transistor 110.

Consider now the situation when control signal generating means 120 has no substantial voltage signal appearing between its output terminals. If there is any voltage stored in the circuit, such as in capacitance 24, leading to gate 14 being positive, there will appear to be an open circuit between terminals 125 and 126. Transistors 121 and 122 will be switched into the "on" condition since the gates of these two transistors are tied to the terminating region serving as a drain thereof in these circumstances. However, transistors 123 and 124 will be switched into the "off" condition since the terminating region of each serving as the source thereof will be close to the potential appearing at terminal 125 but so will the gate region of each of those transistors also be close to the potential occurring at terminal 125. Thus, transistors 123 and 124 will be switched to the "off" condition such that no currents can pass between terminal 125 and 126.

If on the other hand, a more likely situation occurs in which substrate 13 is positive with respect to gate region 14 of transistor 10, there will again appear to be an open circuit between terminals 125 and 126. In this situation, transistors 123 and 124 will both be switched into the "on" condition since the gate of each and the terminating regions serving as the drain of each will be connected to a more negative tending portion of the circuit. However, transistors 121 and 122 will have the gate regions of each connected to the terminating region of each serving as the source thereof and will therefore be switched into the "off" condition.

The usual situation is when capacitance 24 has charge remaining on it because the previous charge provided by command signals from control signal generating means, 120, at terminals 125 and 126 is such that substrate 13 is positive with respect to gate 14. In these circumstances, depletion mode transistor 110 will operate to discharge parasitic capacitance 24 associated with transistor 10. This will be true regardless of the "off" condition or "on" condition of any of the transistors 50, 60, 90, 100, or 10. At some point, if transistor 10 has been in the "on" condition, transistor 10 will switch in the "off" condition which will be discussed below.

Thus, assuming that transistor 10 is in the "off" condition and that capacitance 24 is relatively discharged, a zero voltage range switch will prevent transistor 10 from being switched on whenever the voltage between terminal regions 15 and 16 exceeds a predetermined value. If the polarity of supply 11 is such that the side thereof connected to load 12 is relatively positive, channel terminating region 15 will also be positive with respect to channel terminating region 16 of transistor 10. If the voltage supplied from supply 11 is sufficiently great so as to exceed the sum of the forward voltage drop across parasitic diode 17 and the threshold voltage of transistor 60, ignoring the very small voltage drop across transistor 80, transistor 60 will switch into the "on" condition. This follows because gate region 63 of transistor 60 is connected to channel terminating region 16 of transistor 10 through transistor 80 which is negative with respect to source region 61 of transistor 60 connected to substrate 13. This is so because parasitic diode 17 holds substrate 13 within the forward diode voltage drop of the voltage applied to channel terminating region 15 of transistor 10 assumed positive. Switching transistor 60 into the "on" condition effectively connects gate 14 of transistor 10 to substrate 13 thereof preventing transistor 10 from being switched "on" regardless of the appearance of a command signal or not between terminals 125 and 126 of the control signal source means.

Thus, by adjusting either the threshold voltage of transistor 60 or the forward voltage drop of parasitic diode 17 in these circumstances, the voltage value of supply 11 in which transistor 60 switches into the "on" condition and in which transistor 10 can no longer be switched into the "on" condition by control signal generating means 120 can be predetermined. Typically, the device designer has relatively little control over the forward voltage drop of parasitic diode 17 but has a substantial amount of control over the threshold voltage chosen for transistor 60. Hence, a choice of a threshold voltage of 0.5 volts for transistor 60 would lead to a voltage value of supply 11 of approximately 1.2 volts in excess of which transistor 10 could not be switched into the "on" condition by control signal generating means 120. The value 1.2 volts is the sum of the threshold voltage of transistor 60 of 0.5 volts plus the typical forward voltage drop of parasitic diode 17 of 0.7 volts.

When the output voltage of supply 11 switches polarity so that the side not connected to load 12 becomes relatively positive, channel terminating region 16 become positive relative to channel terminating region 15. If the voltage difference between channel terminating regions 15 and 16 is such as to be greater than the sum of the forward voltage drop of parasitic diode 18 and the threshold voltage of transistor 50, ignoring the very small voltage drop across transistor 70, transistor 50 will be switched into the "on" condition. Again, gate 14 of transistor 10 will be effectively electrically shorted to substrate 13 thereof preventing transistor 10 from being switched into the "on" condition whether or not a signal is being generated between terminals 125 and 126 of the control source means because of signal output from control signal generating means 120. From this polarity of supply 11, the value of the voltage therefrom required to switch transistor 50 into the "on" condition, and thus prevent transistor 10 from being switched into a similar condition, will be determined by the forward voltage drop of the parasitic diode 18 from which a device designer cannot significantly control and the threshold voltage of transistor 50 which a device designer can significantly control.

Consider the situation where supply 11 is, for example, a sinusoidal supply, with a magnitude much greater than the threshold voltages of transistors 50 and 60, and having a frequency within the operating limits of the system. In this situation, there is only a small range of voltage in the output voltage cycle of supply 11 around zero in which transistor 10 can be switched into the "on" condition by a signal appearing at the output terminals of control signal generating means 120. This range in voltage is approximately between zero and the sum of the forward voltage drop of parasitic diode 17 and the threshold voltage of transistor 60 in one polarity of supply 11, and a range in voltage between zero and the sum of the forward voltage drop across parasitic diode 18 and the threshold voltage of transistor 50 in the other polarity of supply 11. When the voltage of supply 11 is within this range, a command signal appearing between the output terminals of control signal generating means 120 will lead to transistor 10 being switched into the "on" condition since transistors 50 and 60 will both be in the "off" condition. Once transistor 10 is switched into the "on" condition, transistors 50 and 60 will not again be switched into the "on" condition by the changing voltage at the output of supply 11 since there will not be a sufficient voltage between terminating regions of transistor 10 to switch on transistors 50 and 60. Under these circumstances, switching transistor 10 into the "on" condition will generate only minimal electromagnetic interference because there will be but a small current change in the power circuit at the time of switching transistor 10 due to the relatively low voltage being provided by supply 11.

The foregoing description to the operation of the circuit shown in FIG. 2 during the commanding of transistor 10 to switch into the "on" condition assumes that the frequency of polarity alternation of supply 11 is sufficiently low such that the other parasitics associated with transistor 10, which have been omitted from FIG. 2, are not significant enough to disrupt the operation of the circuit. In situations where the frequency of alternation of supply 11 may be high enough to cause such parasitics associated with transistor 10 to affect circuit operation, certain bypass means can be provided to control the circuit operation by providing circuit connections which shunt the parasitics to obviate their effects. Such additional circuitry as shown in FIG. 2 is operative in the situations where transistor 10 is in the "off" condition.

This circuitry comprises transistors 40 and 41 in FIG. 2 which are shown therein in long dashed lines to indicate the description of these transistors is not the primary aspect of the present invention. The use and operation of such circuitry has been disclosed in the patent application referenced above having Ser. No. 973,463. There, the bypassing of certain parasitic components including parasitic diodes 17 and 18 are described with the presence of transistors 40 and 41, these transistors being only effective when transistor 10 is in the "off" condition. In operation, transistor 40 is switched into the "on" condition when the side of supply 11 connected to load 12 is positive, and transistor 41 is switched into the "on" condition when the side of supply 11 not connected to load 12 is positive. In switching into the "on" condition, transistors 40 and 41 provide essentially a short circuit between terminating regions and substrate of transistor 10 to bypass the parasitic components. This being so, parasitic diodes 17 and 18 will no longer have a forward voltage drop contributing to determining when the voltage of supply 11 is sufficient to switch on transistors 50 and 60, and so only the threshold voltages of transistors 50 and 60 will be important in determining the range around zero of the output voltage of supply 11 in which transistor 10 can be directed to switch into the "on" condition by control signal generating means 120.

Consider now that control signal generating means 120 provides a voltage signal between its output regions having a substantial magnitude. When the output terminal thereof connected to transistor 121 is positive, transistors 123 and 122 will be in the "on" condition while transistors 121 and 124 will be in the "off" condition. The terminating region of transistor 121 and the terminating region of transistor 123 connected to the output terminal of control signal generating means 120 will be serving as source regions of these transistors while the terminating regions of transistors 122 and 124 connected to the other output terminal of control signal generating means 120 will be serving as drain regions for these transistors. Since the gate regions of transistors 123 and 122 are both connected to the output terminal of control signal generating means 120 which is relatively negative, these transistors will be switched into the "on" condition. Thus, terminal 126 will be positive with respect to terminal 125. A change in polarity of the output signal between the output terminals of control signal generating means 120 will provide just the opposite results again leading to terminal 126 being positive with respect to terminal 125. Thus, there is no difference in relative polarity of terminals 126 and 125 whichever side of control signal generating means is positive. As a result, the output voltage signal between the output terminals of control signal generating means 120 may be either constant polarity or an alternating polarity signal. For the rest of the discussion, the output signal of control signal generating means 120 will be assumed to be sufficiently large so as to provide a voltage between terminal 126 and terminal 125 which is greater than the threshold voltage of transistor 10.

If this voltage appearing between terminals 125 and 126 with 126 positive occurs during a time when the voltage of supply 11 is within the range of zero required by the zero range monitor switch, device theory indicates that transistor 10 can switch into the "on" condition if capacitance 24 is charged with a voltage in excess of the threshold voltage of transistor 10 during the time that the voltage of supply 11 remains within the required range about zero volts. Voltage occurring between terminals 125 and 126 will of course be lowered an amount below what is provided at the output terminals of control signal generating means 120 by the amount of the voltage drop due to the current supplied through transistor 110 and capacitance 24 and the internal impedance occurring in the control signal source means. This impedance will also strongly affect the time constant characteristic of the charging of capacitance 24. Thus, the internal impedance of the control signal source means will be assumed to be quite small as this is a practical achievement in practice. Thus, voltage between terminals 125 and 126 will be substantially equal to the voltage supplied between the output regions of control signal generating means 120, and capacitance 24, itself quite small, will charge very quickly.

The voltage developed between terminals 125 and 126 by control signal generating means 120 will also be applied between the gates and sources of transistors 90 and 100. While typically the threshold voltage of transistors 90 and 100 will be designed to be somewhat greater than the threshold voltage of transistor 10, the voltage between terminals 125 and 126 will be assumed to be sufficiently large so as to exceed the threshold voltages of transistors 90 and 100 as well as that of transistor 10. In these circumstances, device theory indicates that transistors 90 and 100 will be switched into the "on" condition as the gates thereof connected to the terminal 125 will be negative with respect to the sources thereof connected to terminal 126. If transistor 90 is switched into the "on" condition, transistor 50 is off, and thereafter prevented from switching into the "on" condition whatever the voltage provided by supply 11 since gate 53 of transistor 50 is effectively shorted to source 51 thereof. Similarly, transistor 60 will be prevented from switching into the "on" condition by transistor 100 being in the "on" condition because gate 63 of transistor 60 will be effectively shorted to source 61 thereof. Thus, transistors 90 and 100 being in the "on" condition leads to transistors 50 and 60 being held in the "off" condition which transistors 90 and 100 control regardless of the voltage being provided by supply 11 to the gates of transistors 50 and 60. When the side of supply 11 not connected to load means 12 is positive, current is drawn from supply 11 through parasitic diode 18 by transistor 90 and returned through transistor 70. Since transistor 90 is intended to be a signal transistor and is not to have any significant power dissipated therein, transistor 70 must be configured by the device designer to pass a relatively small current. Similarly, when the side of supply 11 connected to load 12 becomes positive, transistor 100 can draw current from supply 11 through parasitic diode 17 and returned through transistor 80 which again must be limited to a relatively small current flow. Transistors 70 and 80, whether acting as current sinks or resistances as aforedescribed, provide an impedance means to limit the current through transistors 90 and 100, respectively.

To switch transistors 10 in FIG. 2 into the "off" condition in the foregoing circumstances, the presence of a signal between the output terminals of control signal generating means 120 is terminated thereby causing the control signal source to appear to be an open circuit between terminals 125 and 126. However, there will be no immediate change in the voltage appearing between terminals 125 and 126 because parasitic capacitance 24 having been charged by command signals from the control source means cannot discharge immediately. Thus, not only does transistor 10 remain in the "on" condition, at least temporarily, but so do transistors 90 and 100 which in turn means that transistors 50 and 60 are forced to remain in the "off" condition. The just described conditions of these transistors will remain without change so long as the voltage across capacitance 24 remains greater than the threshold voltages of transistors 10, 90, and 100.

The voltage across capacitance 24, in these circumstances, is continually decreasing as transistor 110 is continually discharging capacitance 24 at a linear rate depending on the effective current drain provided thereby and behaving substantially like a current sink. Thus, the voltage across capacitance 24 will continually decrease until it approaches the threshold voltages of either transistor 10 or transistors 90 and 100, the latter two likely to be approximately the same since these two transistors will be fabricated identically using monolithic integrated circuit techniques in a normal situation.

For understanding, consider first the undesirable situation where the threshold voltages of each of transistors 90 and 100 is significantly less than that of transistor 10. As above noted, capacitance 24 discharges and the voltage thereacross decreases approaching the threshold voltage of transistor 10 at a rate determined by the effective value of capacitance 24 and the effective current value of the current sink that substantially characterizes the behavior of transistor 110. As the voltage between gate 14 of transistor 10 and substrate 13 decreases and approaches a value near the threshold voltage of transistor 10, the effective channel resistance between terminating regions 15 and 16 therein increases leading to the root-mean-square (rms) current therethrough to decrease and the rms voltage between terminating regions 15 and 16 to increase. The rate of decrease of this rms current and the rate of increase of this rms voltage will approximately be equal to the rate at which the voltage between the gate, 14, of transistor 10 and the substrate, 13, thereof is decreasing. The relationship between the current flowing from terminating region to terminating region of transistor 10, though parabolically related to the voltage between the gate and substrate thereof, does not differ too much from being linear except when the gate to substrate voltage is very near the threshold voltage of the device. Of course, the instantaneous power being dissipated in transistor 10 is equal to the product of the voltage occurring between terminating regions 15 and 16 thereof and the current passing through these regions. In the situation here, the power dissipated is initially quite small since transistor 10 in the "on" condition has very little voltage occurring between terminating regions 15 and 16. However, as the effective resistance occurring between terminating regions 15 and 16 of transistor 10 begins to increase as transistor 10 begins to switch into the "off" condition, power dissipation rises rapidly until transistor 10 is actually switched into the "off" condition at which time current is essentially zero. Thus, in these circumstances where transistors 90 and 100 are in the "off" condition through the time between the terminating of a command signal at the output terminals of control signal generating means 120 and the time at which transistor 10 finally switches into the fully "off" condition, the rate at which the impedance increases between terminating regions 15 and 16 of transistor 10 is determined by the rate of discharge of capacitance 24 by transistor 110. If this discharge rate is quite slow, a very substantial amount of power can be dissipated in transistor 10, but on the other hand, if the rate of discharge of capacitance 24 is too rapid, there will be changes in the current through terminating regions 15 and 16 of transistor 10 that may be quite rapid which would result in a large amount of radiated electromagnetic energy leading to potential interference in nearby electronic systems. Thus, the choice of a capacitance value for capacitance 24 and of the current sink value of transistor 110 can be quite critical in these circumstances where the threshold voltage of transistors 90 and 100 is sufficiently low such that they are not effective before transistor 10 is switched into the "off" condition.

A further disadvantage involving electromagnetic radiation interference is that with transistors 90 and 100 being always in the "on" condition maintaining transistors 50 and 60 in the "off" condition during the entire time between cessation of a signal at the output regions of control signal generating means 120 and the actual switching of transistor 10 into the "off" condition, means that a new signal occurring at the output regions of control signal generating means 120 in this period can immediately again switch transistor 10 into the "on" condition at any random value of voltage or point in a cycle of the output voltage of supply 11. Thus, should transistor 10 switch into the "on" condition with a relatively large voltage developed between terminating regions 15 and 16 of transistor 10, a substantial amount of electromagnetic radiation may be emanated to potentially interfere with sufficiently nearby electronic systems.

Again for understanding, consider another undesirable situation, that of the threshold voltage of transistors 90 and 100 being significantly greater than that of transistor 10. Once again, as a signal between the output regions of control signal generating means 120 ceases, there can be no immediate change in the voltage between gate, 14, of transistor 10 and the substrate thereof, or a change in the voltage between the terminating regions 15 and 16 thereof. That is, capacitance 24 remains charged and is only discharged at a rate set by its capacitance value and the current sink value of transistor 110 behaving primarily as a current sink. Thus, transistors 10, 90, and 100 remain in the "on" condition with transistors 50 and 60 being forced to remain in the "off" condition. Thus, the voltage across capacitance 24 decreases at a linear rate toward the threshold voltage of transistors 90 and 100 and the effective resistance between terminating regions 15 and 16 of transistor 10 begins to increase leading to decreasing current therethrough and increased power dissipation therein as described earlier.

When the voltage across capacitance 24 and thus between gate region 14 of transistor 10 and substrate 13 thereof falls below the threshold voltages of transistors 90 and 100, likely to be approximately equal since these transistors will be usually fabricated identically in a monolithic integrated circuit chip, transistors 90 and 100 will switch into the "off" condition eliminating their controlling the voltage at which gates 53 and 63 of transistors 50 and 60, respectively.

As a result, one of the problems encountered in a situation where the threshold voltages of transistors 90 and 100 are much below that of transistor 10 are eliminated in this situation when the threshold voltage of transistors 90 and 100 are much above that of transistor 10. That is, the zero range monitor switch is enabled so that transistor 10 cannot be caused to indiscriminately switch back into the "on" condition by a new command signal once the voltage between gate 14 and substrate 13 of transistor 10 is dropped below the threshold voltages of transistors 90 and 100, at least at the point when the effective resistance between terminating regions 15 and 16 of transistor 10 is sufficiently great to provide a voltage drop there across to operate transistors 50 and 60. Therefore, the risk of having transistor 10 switch back into the "on" condition with a relatively high voltage between terminating regions 16 and 15 thereof is much reduced as is the concomitant chance of substantial electromagnetic radiation accompanying such a command to transistor 10.

However, a new problem arises in this situation because the zero range monitor switch is now operative. Since transistors 50 and 60 are switched into the "on" condition as soon as the output voltage supply 11 exceeds some range about zero, transistors 50 and 60 will switch into the "on" condition and provide a very low impedance path to discharge capacitance 24. If the threshold voltage of transistors 90 and 100 are significantly enough greater than that of transistor 10, the effective resistance between terminating regions 15 and 16 of transistor 10 may not have yet become very great at the moment transistors 50 and 60 switch into the "on" condition to rapidly discharge capacitance 24. Since the effective resistance between terminating regions 15 and 16 increases at nearly the rate that the voltage between gate region 14 and substrate 13 of transistor 10 decreases, as indicated above, there can be an extremely rapid reduction of current flowing between regions 15 and 16 of transistor 10 after transistors 50 and 60 begin to rapidly discharge capacitance 24. Such a sharp or rapid change in currents which can flow through terminating regions 15 and 16 of transistor 10 can lead to substantial electromagnetic radiation emanating from the circuit shown in FIG. 2 to potentially interfere with sufficiently nearby electronic systems. Of course, this also eliminates the problem of any excessive power being discharged in transistor 10 since the change in effective impedance between terminating regions 15 and 16 will be quite rapid.

The desirable situation is to have the threshold voltages of transistors 90 and 100 exceed the threshold voltage of transistor 10 by a relatively small amount. In these circumstances, capacitance 24 is discharged by transistor 110 at a relatively slow rate so as to cause the effective resistance between terminating regions 15 and 16 of transistor 10 to increase at approximately the same rate and therefore to have the rms current through terminating regions 15 and 16 decrease at an acceptably slow rate to avoid electromagnetic radiation leading potentially to interference of sufficiently nearby electronic systems. The rate can be adjusted by the device designer in his design for transistor 110 taking into account the value of capacitance 24 associated with transistor 10 so that the rate of discharge of capacitance 24, and the rate of increase in the effective resistance between terminating regions 15 and 16, is not too slow to lead to excessive power dissipation of transistor 10. When the discharge of capacitance 24 is sufficiently far along that the voltage across capacitance 24 becomes less than the threshold voltages of transistors 90 and 100, transistors 50 and 60 can then be switched into the "on" condition by sufficient voltage occurring across the effective resistance between terminating regions 15 and 16. That is, the zero range monitor switch becomes active so that voltages outside a selected range about zero of the output voltages of supply 11 can switch transistors 50 and 60 into the "on" condition which will lead to a rapid discharge of the remaining charge on capacitance 24. However, this will not lead to substantial amounts of electromagnetic radiation as the rms current through transistor 10 will be reduced to a sufficiently small value at this point.

Note that the zero range monitor switch can be operated to control the voltage across capacitance, 24, of transistor 10 at times when transistor 10 is commanded to switch into the "off" condition without the provision for the control provided by transistors 90 and 100 to prevent transistor 10 from being switched into the "off" condition when substantial currents are flowing through transistor 10. Thus, transistors 90 and 100 can be entirely eliminated and transistors 70 and 80 can be replaced by short circuits. Under these circumstances, capacitance 24 will again be discharged by transistor 110 as previously described. However, transistors 50 and 60 can be switched into the "on" condition as soon as the effective resistance has increased sufficiently in transistor 10 to lead to voltages occurring between terminating regions 15 and 16 of sufficient magnitude to switch on transistors 50 and 60. This, of course, leads to transistor 10 rapidly switching to the "off" condition. Depending on the particular circuit application, i.e. the nature of load 12, such operation may not lead to electromagnetic radiation occurring with unacceptably high potential for interference with sufficiently nearby electronic systems.

FIG. 2 also shows an alternative control signal source means in long dashed lines which can be used as an alternative to the control signal source means connected to the left of terminals 125 and 126. That is, control signal generating means 120 and transistors 121, 122, 123, and 124 can be eliminated in the circuit of FIG. 2 and replaced by another control signal source means. The advantage of the second control signal source means is that it can operate from power supplied by supply 11 rather than requiring its own electrical power supply as does the control source means shown to the left of terminals 124 and 126 which depends on electrical power supplied by control signal generating means 120.

This alternative control signal source means includes a capacitor, 17, having one side thereof electrically connected to substrate 13 of transistor 10. Connected to the other side of capacitor 27 is an enhancement mode, p-channel IGFET, 29, having one of its terminating regions connected to the side of capacitor 27 not connected to substrate 13 and its other terminating region and gate region connected to the side of supply 11 not connected to load means 12. Transistor 29 is serving effectively as a diode means with its effective anode connected to capacitor 27 and its effective cathode connected to supply 11. Another diode, 28, shown with its anode also connected to the side of capacitor 27 not connected to substrate 13, and with its cathode connected to the side of supply 11 connected to load means 12. Another possibility is to have the cathode of diode 28 electrically connected to the side of load 12 which is connected to terminating region 15 of transistor 10. Either of these arrangements for diode 28, and much of this alternative control signal source means has been disclosed in the patent application referenced above having Ser. No. 973,463. A slight difference between that application and what is shown in FIG. 2 occurs in the control switch means, 33. As shown in FIG. 2 herein, control switch means 33 has but a single primary directing transistor, 35, which is an enhancement mode, p-channel IGFET. One terminating region of transistor 35 is electrically connected to the side of capacitor 27 connected to diode 28, and the other terminating region of transistor 35 is electrically connected to gate 14 of transistor 10. Switch control circuitry, 36, is connected to the gate of transistor 35 and switch control circuitry 36 is connected across capacitor 27 which provides a source of electrical power to switch control circuitry 36. Switch control circuitry 36 determines whether transistor 35 is to be switched into the "on" condition or into the "off" condition to control the condition of transistor 10. The last mentioned patent application shows a second signal control directing transistor included in control switch means 33, but this is unnecessary and unwanted in the present circuit and its role is essentially provided by transistor 110 without any switch behavior which would otherwise abruptly discharge capacitance 24.

As disclosed in the last mentioned patent application, with transistor 10 in the "off" condition, supply 11 charges capacitor 27 in a first polarity through a circuit path including load 12, parasitic diode 17 or alternatively transistor 40 if the latter is used as described above, capacitor 27 and transistor 29 or diode means 29. In the opposite polarity, with transistor 10 off, capacitor 27 is charged by supply 11 through parasitic diode 18 or transistor 41 if the latter is used as described above, capacitor 27 and diode 28. The resulting voltage developed across capacitor 27 has a magnitude slightly less than the peak value of supply 11 and a polarity such that the side of capacitor 27 connected to substrate 13 of transistor 10 is positive relative to the other side thereof. Supply 11 concurrently supplies circuitry 36.

If transistor 10 is on, the supply 11 in one polarity will charge capacitor 27 and supply circuitry 36 along the circuitry path including parasitic diode 18 or alternatively transistor 41 if the latter is used. However, in the opposite polarity having transistor 10 in the "on" condition prevents capacitor 27 from being charged by supply 11. In this polarity, the energy stored in capacitor 27 is used to provide energy to switch means 33 as well as to provide a voltage for operating transistor 10 in the "on" condition.

This alternative control signal source means operates under the direction of signals developed in circuitry 36. If conditions in switch control circuitry 36 are such as to provide a signal rendering transistor 35 being switched into the "on" condition, two situations can occur as before. In the first situation, the voltage between one of the terminating regions 15 or 16 of transistor 10 and the substrate 13 is smaller than the threshold voltages of transistors 50 or 60, one or the other of transistors 50 and 60 will be in the "off" condition. In this situation, capacitor 27 in series with the channel region of transistor 35 is effectively connected in parallel with capacitance 24, as well as being electrically in parallel with transistor 110. If supply 11 and capacitor 27 can supply sufficient current beyond that required to match the current sink capability of transistor 110, capacitance 24 will charge to a value somewhere near peak value voltage developed across capacitor 27. As a result, assuming this voltage is greater than the threshold voltage of transistor 10, transistor 10 will be switched into the "on" condition.

The second situation, the voltage between one of the terminating regions 15 of 16 of transistor 10 and substrate 13 thereof will be greater than threshold voltages of transistors 50 and 60 leading to one or the other of transistors 50 or 60 being switched into the "on" condition. In this situation, capacitor 27 is effectively in series with the channel region of transistor 35 which together are electrically connected in parallel across capacitance 24, across transistor 110, and across the channel regions of transistors 50 and 60.

In these circumstances, current will flow from capacitor 27 or supply 11 attempting to change capacitance 24. Capacitance 24 will change approximately to a voltage primarily dependent on the ratio of the effective channel resistances of either of transistors 50 or 60, whichever one is in the on condition, and the channel resistance of transistor 35. If the channel resistance of transistor 35 is sufficiently larger than that of either transistors 50 or 60 in the on condition, the resulting voltage across capacitance 24 will be less than the threshold voltage of transistor 10 such that transistor 10 cannot switch into the "on" condition. Thus allowing the zero range monitor to function as described earlier. To ensure that the voltage across capacitance 24 is sufficiently small when either transistor 50 or 60 is in the "on" condition, the addition of impedance means, 37, (shown as a dashed component) between terminating region of transistor 35 and gate 14 of transistor 10 may be desired. This resistance must not be too large, as this resistance will enter into the time constant determining how fast capacitance 24 can be charged from capacitor 27 and supply 11.

Thus, the zero range monitor switch comprising transistors 50 and 60 will operate essentially in the same manner using the alternative control signal source shown in long dashed lines in FIG. 2 as it would with the control signal source shown to the left of terminals 125 and 126 in that figure. This is also true of the control means operating with the zero range monitor switch involving transistors 90 and 100 as well as transistors 70 and 80. This immediately follows since a signal generated in switch control circuitry 36 running transistor 35 in the "off" condition immediately leads to an open circuit between gate 14 of transistor 10 and remaining portions of the alternate control signal source shown in long dashed lines. Since this is exactly the situation reached for the control signal source means to the left of terminals 125 and 126 in FIG. 2, the same operating results will be achieved in situations where switch control circuitry 36 directs the switching of transistor 10 into the "off" condition from the "on" condition.

Note that when transistor 10 is switched into the "on" condition, charging current for capacitor 27 will flow through parasitic diode 18 during one polarity of supply 11 as indicated above. Since transistors 40 and 41 are not effective as shunts when transistor 10 is in the on condition, current through diode 18 may result in unwanted effects in the operation of the circuitry because of parasitic components associated with transistor 10. In some applications, this situation may lead to the necessity of providing a bypass means for parasitic diode 18 which is operable when transistor 10 is in the "on" condition.

Such a bypass means for parasitic diode 18 is disclosed in the patent application referenced above having Ser. No. 116,052. One form of such bypass means is shown in FIG. 2 as a long dashed line connection involving a further enhancement mode, p-channel IGFET, 43. Transistor 43 has one of its terminating regions connected to terminating region 16 of transistor 10 and its other terminating region connected to substrate 13 of transistor 10. The gate region of transistor 43 is electrically connected to the gate region 14 of transistor 10. Transistor 43 will electrically connect substrate 13 to terminating region 16 of transistor 10 whenever gate 14 of transistor 10 is held negative with respect to substrate 13 thereof for the purpose of having transistor 10 in the "on" condition. This leads to providing a shunt for parasitic diode 18 during those times transistor 10 is in the "on" condition. Transistor 43 does not affect operation of either the control signal source means to the left of terminals 125 and 126 in FIG. 2 or the alternate control signal source means shown in long dashed lines in FIG. 2. Further, the presence of transistor 43 does not affect the operation of the zero range monitor switch nor the further control circuitry associated therewith involving transistors 90 and 100.

Figure 3:
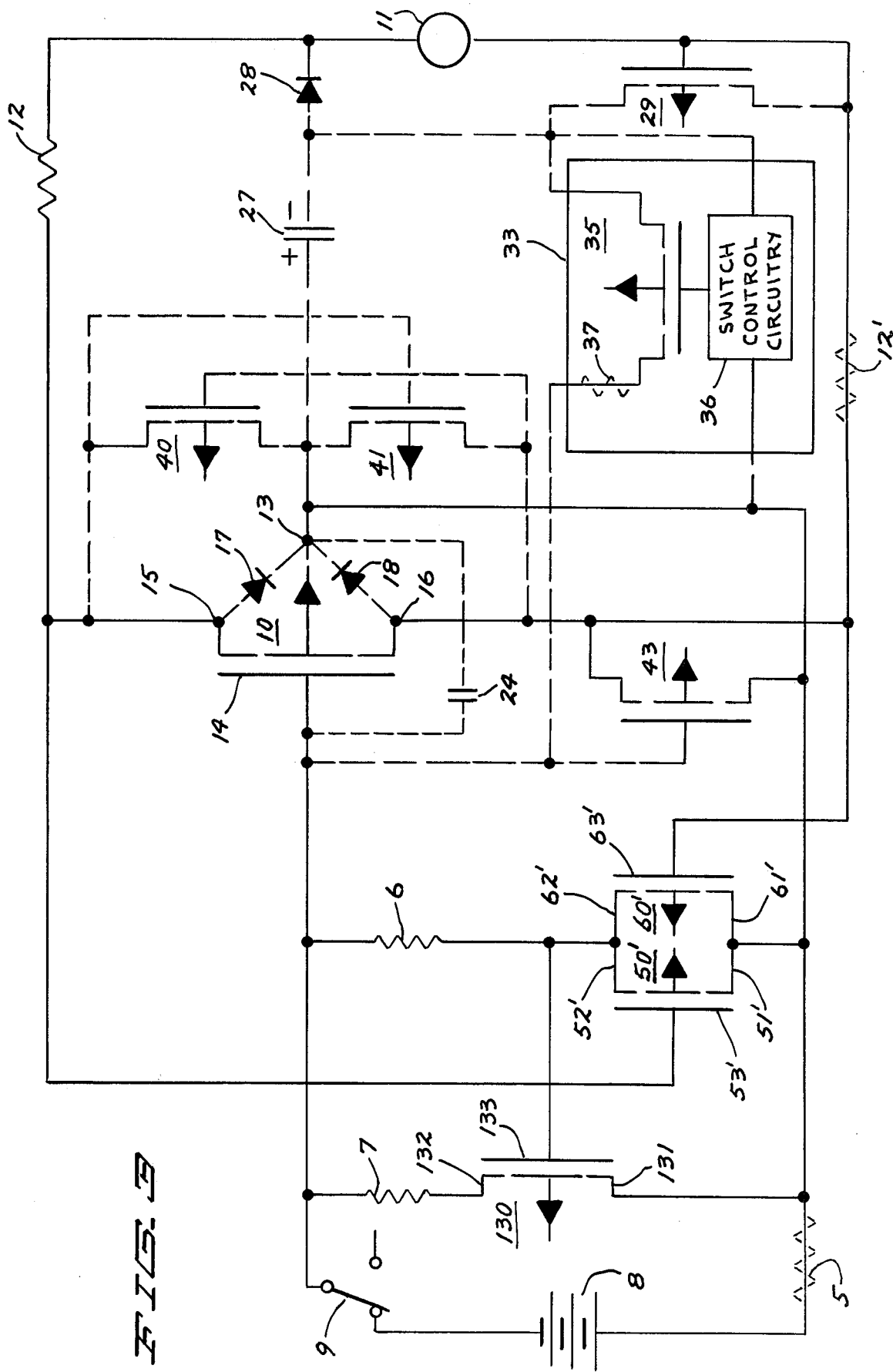
FIG. 3 shows an embodiment of the circuit of the present invention in schematic diagram form to be used again for the same purpose.

A further arrangement for a zero range monitor switch and control circuitry associated therewith for the situation in which transistor 10 is being switched into the "off" condition is shown in FIG. 3. The circuit of FIG. 3 utilizes the same kind of field-effect transistor device as is used in the circuit of FIG. 2 as a primary power transfer control device, with the same kinds of parasitics, for controlling transfers of electrical power from the same alternating polarity power supply 11 to load means 12, or alternatively to load means 12'.

First, a control signal source means shown in solid lines in FIG. 3 is just the one shown in FIG. 1 comprising constant polarity voltage source means 8 and switch means 9. However, switch means 9 is no longer electrically interconnected to transistor 10 to permit connecting gate 14 of transistor 10 to substrate 13 thereof in FIG. 3 as it was in FIG. 1. Rather, switch 9 merely connects voltage source 8 to gate 14 or otherwise provides an open circuit between voltage source 8 and gate 14. However, control signal source means to the left of terminals 125 and 126 in FIG. 2 could again be used in place of voltage source 8 and switch 9 in FIG. 3. Also, the alternate control signal source means shown in long dashed lines in FIG. 2 can be used in the circuit of FIG. 3, and this control signal source means has been so indicated in FIG. 3 again in long dashed lines.

The circuit shown in FIG. 3 also includes a zero range monitor switch which includes two enhancement mode, p-channel IGFET's, 50' and 60'. Transistors 50' and 60' have source regions, 51' and 61', respectively, electrically connected to substrate 13 of transistor 10. Transistor 50 has a gate region, 53', electrically connected to channel terminating region 15 of transistor 10. Transistor 60' has a gate region, 63', electrically connected to channel terminating region 16 of transistor 10. Transistors 50' and 60' have drain regions, 52' and 62', respectively, electrically connected to one end of a resistor, 6. The other end of resistor 6 is connected to gate region 14 of transistor 10.

Further, electrically connected between gate region 14 and substrate 13 of transistor 10 is a series combination of a resistor, 7, and another enhancement mode, p-channel IGFET, 130. Transistor 130 has a terminating region, 131, electrically connected to substrate 13 of transistor 10. Another terminating region, 132, of transistor 130 is electrically connected to one end of resistor 7. The remaining end of resistor 7 is electrically connected to gate region 14 of transistor 10. Transistor 130 has a gate region, 133, electrically connected to terminating regions 52' and 62' of transistors 50' and 60', respectively.

All of the just described circuit connections in FIG. 3 serve the purpose of avoiding abrupt current changes when transistor 10 is switched into the "off" condition from the "on" condition. That is, the zero range monitor switch involving transistors 50' and 60' in FIG. 3 does not serve to restrict the switching of transistor 10 into the "on" condition in only those times when the voltage at the output of supply 11 is within a range near zero volts, and hence when the voltage between terminating regions 15 and 16 of transistor 10 is relatively small. This is so because of the presence of resistor 6 switching "on" of transistors 50 and 60 still leaves a substantial impedance between gate 14 of transistor 10 and substrate 13 thereof. To obtain restriction of switching "on" of transistor 10 to only those times when the voltage at the output of supply 11 is within a limited range about zero volts, a further resistor, 5, must be connected in the circuit of FIG. 3. Resistor 5 is shown in dash lined in FIG. 3 and is shown connected between substrate 13 and the positive side of constant polarity voltage 8.

In the initial discussion concerning the circuit of FIG. 3, resistor 5 will be assumed to have been omitted. There may be some circuit applications when it is not important to restrict the switching of transistor 10 into the "on" condition at times when the voltages thereacross are relatively small. Operation of the circuit of FIG. 3 will be described with resistor, 5, in place therein later in the description concerning the circuit.

Thus, if transistor 10 has been in the "off" condition because switch 9 has been positioned to omit constant polarity voltage source 8 from the circuit, the change in position of switch 9 to include source 8 will provide a circuit for rapidly charging capacitance 24 of transistor 10. As soon as the voltage across capacitance 24 exceeds the threshold voltage valve of transistor 10, transistor 10 will switch into the "on" condition substantially without any regard as to the value of the output voltage or polarity at the output of supply 11. Switching "on" transistor 10 leads to power transfer from supply 11 to load 12, and leads to the voltage between terminating regions 15 and 16 of transistor 10, or between substrate 13 and whichever of terminating regions 15 or 16 is currently negative being less than the threshold voltage of either transistors 50' or 60' assuming transistors 50' and 60' have been designed to have a sufficiently large threshold voltage. As a result, transistors 50' and 60' will be switched into the "off" condition when transistor 10 is in the "on" condition.

Both transistors 50' and 60' being off, transistor 130 will switch into the "on" condition as gate region 133 thereof is effectively electrically connected through resistor 6 to the negative side of source 8 through switch 9, assuming that source 8 supplies a voltage greater than the threshold voltage of transistor 130 as well as a voltage greater than the threshold of transistor 10 to hold transistor 10 "on". Switching transistor 130 into the "on" condition effectively connects resistance 7 between gate region 14 of transistor 10 and substrate 13 thereof. Thus, resistance 7 is effectively in parallel with capacitance 24 of transistor 10.

In order to now switch transistor 10 into the "off" condition, switch 9 must be opened to remove constant polarity voltage source 8 from the circuit. However, because of the charge on capacitance 24 of transistor 10, the voltage between gate region 14 of transistor 10 and substrate 13 thereof will not instantaneously change. As a result, transistors 10 and 130 will remain in the "on" condition, at least initially. As a result, capacitance 24 will begin to discharge through resistor 7 and transistor 130 which serve as a discharge means for the voltage which occurs across capacitance 24. The rate of discharge will be substantially determined by the time constant comprising the resistance value for resistance 7 and the capacitance value for capacitance 24.

In these circumstances, the voltage across capacitance 24 will decrease toward the threshold voltage of transistor 10 leading to transistor 10 beginning to have an increased effective resistance between terminating regions 15 and 16 thereof. As a result, the rms voltage between terminating regions 15 and 16, and between that one of terminating regions 15 and 16 which is negative and substrate 13, will increase which will mean that transistors 50' and 60' will begin to be switched on when the voltage from supply 11 in either polarity increases beyond a limited range about zero volts in the same manner as transistors 50 and 60 were switched into the "on" condition in the circuit of FIG. 2. Switching either of transistors 50' or 60' on will result in switching transistor 130 into the "off" condition and provide a new discharge path for capacitance 24 through resistance 6 and transistors 50' and 60'. As transistors 50' and 60' can switch into the "on" condition only when the effective resistance between terminating regions 15 and 16 is relatively high, and hence the rms current flowing through terminating regions 15 and 16 has become relatively low, resistance 6 can be considerably smaller than resistance 7 leading to a more rapid discharge of capacitance 24 without the danger of sharp changes in the current flowing between terminating regions 15 and 16 and the concomitant in electromagnetic radiation. That is, during the initial discharge of capacitance 24 and the simultaneous beginning of switching transistor 10 into the "off" condition, relatively high currents flow between terminating regions 15 and 16 of transistor 10 and so the discharge of capacitance 24 is intended to be through the relatively high resistance 7 resulting in a somewhat slowly increasing resistance between terminating regions 15 and 16. During later portions of the sequence leading to switching transistor 10 off the discharge of capacitance 24 can be relatively rapid since the currents flowing through terminating regions 15 and 16 will be relatively small due to the significantly higher resistance between terminating regions 15 and 16. Further, the threshold of transistor 130 should be set by the device designer to be less than that of transistor 10 so that voltage across capacitance 24 is sufficient to force transistor 130 to remain on during those times that capacitance 24 is discharging toward the threshold voltage of transistor 10 prior to transistors 50' and 60' being switched into the "on" condition as a result of sufficient voltage between terminating regions 15 and 16.

When the discharge of capacitance 24 is sufficiently complete through resistor 7 and transistor 130 to permit the increasing effective resistance between terminating regions 15 and 16 of transistor 10 to lead to voltages occurring therebetween sufficient to turn on transistors 50' and 60', there can be a cycling between the usage of the two discharge paths present depending on the frequency of supply 11. That is, initially resistor 7 and transistor 130 will discharge capacitance 24. Then one of transistors 50' and 60' will switch on at some value of output voltage of supply 11 outside the limited range about zero leading to switching transistor 130 off and provide a discharge path involving resistor 6 and either transistor 50' or 60' depending on the polarity of the output voltage of supply 11. As the voltage on supply 11 comes back into the limited range about zero volts, transistors 50' and 60' will be off and transistor 130 will be switched on leading to a discharge path for capacitance 24 through resistance 7 again. As the output voltage of supply 11 changes in polarity and has a value outside the limited range about zero voltage, the opposite one of transistors 50' and 60' will come on leading to a discharge path again through resistor 6 as transistor 130 is switched to the "off" condition. This cycling between discharge paths of capacitance 24 will continue until capacitance 24 is discharged below the threshold of transistor 10 and is switched into the "off" condition. Again, there is some limitations on the value of resistance chosen for resistor 7. If the value is too small, capacitance 24 may discharge too rapidly resulting in sharp changes in the currents flowing through terminating regions 15 and 16 of transistor 10 and the concomitant electromagnetic radiation which can potentially interfere with sufficient nearby electronic systems. If the resistance value of resistance 7 is too large, capacitance 24 may discharge too slowly resulting in transistor 10 increasing its effective resistance between terminating regions 15 and 16 so slowly that substantial amounts of power are dissipated therein before transistor 10 is fully switched into the "off" condition. Such dissipation may lead to failure or disruption of the operation of the various circuits involved. Thus, the value for the resistance for resistor 7 must be chosen so as to avoid these two extremes given the capacitance value for capacitance 24 associated with transistor 10. This capacitance value will be inherent and will be set by the design for transistor 10 which must be such as to pass the currents desired through load 12 with very little voltage drop occurring between terminating regions 15 and 16.

The only restriction on the value for resistor 6 is that it be sufficient to limit the current drawn from constant polarity voltage source 8 in the circuit of FIG. 3 as so far described. However, should the operator of the system shown in the circuit of FIG. 3 desire that transistor 10 be switched in the "on" condition only at times when the voltage thereacross is relatively low to prevent undue electromagnetic radiation from emanating from the circuit, the measure mentioned above of adding resistor 5 leads to another restriction on the resistance for resistor 6. This is because the addition of resistor 5 leads to a voltage divider network in the circuit of FIG. 3 across constant polarity voltage source 8. The network comprises resistor 5 and whichever of resistors 6 or 7 is in the circuit depending on whether transistor 130 or one of transistors 50' and 60' is switched into the "on" condition. With the value of resistor 7 chosen as indicated above, the value of resistor 5 is to be such that the ratio of values between resistors 7 and 5 will be such that the fraction of voltage occurring across resistor 7 will exceed the threshold voltage of transistor 10. On the other hand, the resistance value chosen for resistor 6 will be such that the ratio of resistances between resistors 6 and 5 is such that the fraction of voltage of source 8 appearing across resistor 6 will be less than the threshold value of transistor 10.

Thus, with transistor 10 in the "off" condition and switch 9 positioned to place constant polarity voltage source 8 in the circuit to charge capacitance 24, there will be two situations depending on whether transistors 50' or 60' are in the on or the off condition. If the voltage provided by supply 11 is outside the limited range about zero established potentially by the thresholds of transistors 50' and 60' in the same manner as established by transistors 50 and 60 in the circuit of FIG. 2, one of transistors 50' or 60' will be switched into the "on" condition depending on the polarity of supply 11. This will lead to transistor 130 having gate region 133 thereof connected to source region 131 such that transistor 130 is switched into the "off" condition. Under these circumstances, capacitance 24 charges toward the value of the voltage appearing across resistor 6. Since the voltage of supply 11 is outside the limited range about zero, transistor 10 should not be switched into the "on" condition in these circumstances if electromagnetic radiation is to be kept suitably small, and thus the ratio values for resistor 6 to resistor 5 should be such that the voltage across resistor 6 cannot exceed the threshold voltage of transistor 10, so that transistor 10 cannot be switched "on" in these circumstances.

As the voltage supply 11 enters into the limited range about zero, whichever of transistor 50' or 60' was in the on condition will switch into the off condition. As a result, transistor 130 will be switched into the on condition leading to permitting capacitance 24 to be charged to the value of voltage appearing across resistor 7. Since the voltage from supply 11 is relatively low, transistor 10 is desired to be switched "on" in this situation, and so the resistance value ratio of resistor 7 to resistor 5 should be such that the voltage across resistor 7 will exceed the threshold voltage of transistor 10. The presence of resistor 5 will not affect the earlier description of the operation of the circuit shown in FIG. 3 when transistor 10 is being switched from the "on" into the "off" condition by opening switch 9 which removes both source 8 and resistor 5 from the gate 14-substrate 13 circuit of transistor 10.

Other alternative locations of resistor 5 different than shown in FIG. 3 are possible to provide the voltage divider networks between resistors 5, 6, and 7 so that the zero range monitor switch can function to switch transistor 10 in the "on" condition only at times when the voltage thereacross is relatively low.

Again, as in the circuit of FIG. 2, the circuit of FIG. 3 may also be provided with means for bypassing parasitic diodes 17 and 18, both when transistor 10 is in the "off" condition and when transistor 10 is in the "on" condition. To this end, transistors 40, 41, and 43 are shown in long dashed line interconnections in the circuit of FIG. 3 in the same locations in which they appear in the circuit of FIG. 2, and they operate as described in connection with the operation of FIG. 2.

The control signal source means comprising constant polarity voltage source 8 and switch 9 may alternatively be provided by the control signal source arrangement shown in long dashed lines in FIG. 3 matching the same alternative control signal source shown to the right of terminals 125 and 126 in long dashed lines in FIG. 2. This alternative control signal source means operates in the same way in the circuit of FIG. 3 as does the alternate control signal source means shown in FIG. 2, and no further description will be provided.

The transistors shown in the circuits of FIGS. 2 and 3 may, in each instance, be fabricated in a single monolithic integrated circuit chip leading to the substrates of each of these transistors being electrically in common with one another. This includes transistor 10 as well as the signal transistors, including those associated with the control signal source means to the left of terminals 125 and 126 in FIG. 2 and in the alternative control signal source means shown in long dashed lines in both FIGS. 2 and 3, and the bypass transistors 40, 41, and 43 shown in FIGS. 2 and 3. Several of the other components shown in the circuits of FIGS. 2 and 3 may also be conveniently fabricated in the same monolithic integrated circuit chip. Also to be noted, the circuits shown in FIGS. 2 and 3 could also be implemented using n-channel devices as an alternative to the p-channel devices shown there.

The embodiments of the invention in which an exclusive property or right is claimed are defined as follows:

1. An electronic switching circuit for controlling transfer of electrical power from an alternating polarity electrical power supply means to a load means, said switching circuit comprising:
   a first transfer control field-effect device provided in and on a first substrate, said first transfer control field-effect device comprising:
   a first transfer control field-effect device channel region located at least in part in a first selected region of said first substrate;
   first transfer control field-effect device first and second terminating regions, separated by said first transfer control field-effect device channel region, into which and out of which primary currents through said first transfer control field-effect device can, at least in part, pass upon electrical energization of said first transfer control field-effect device first and second terminating regions, said first transfer control field-effect device first terminating region being electrically connected to a first terminal means adapted for electrical connection to a first circuit portion arrangement which includes both said alternating polarity electrical power supply means and said load means, said first transfer control field-effect device second terminating region being electrically connected to a second terminal means adapted for electrical connection to said first circuit portion arrangement; and a first transfer control field-effect device gate region capable of affecting, upon electrical energization thereof, any current flow occurring through said first transfer control field-effect device channel region as a result of electrical energization of said first transfer control field-effect device first and second terminating regions;

a first threshold switch means having first and second terminating regions and having a control region therein by which said first threshold switch means is capable of being directed to effectively provide a conductive path of a selected conductivity between said first threshold switch means first and second terminating regions if a selected threshold magnitude is crossed during value changes in a signal applied to said first threshold switch control region, said first threshold switch means first terminating region being electrically connected to said first transfer control field-effect device gate region, said first threshold switch means second terminting region being electrically connected to said first substrate, and said first threshold switch means control region being electrically connected to one of said first transfer control field-effect device first and second terminating regions; and a second threshold switch means having first and second terminating regions and having a control region therein by which said second threshold switch means is capable of being directed to effectively provide a conductive path of a selected conductivity between said second threshold switch means first and second terminating regions if a selected threshold magnitude is crossed during value changes in a signal applied to said second threshold switch control region, said second threshold switch means first terminating region being electrically connected to said first threshold switch means first terminating region, said second threshold switch means second terminating region being electrically connected to said first threshold switch means second terminating region, and said second threshold switch means control region being electrically connected to that one of said first transfer control field-effect device first and second terminating regions opposite that to which said first threshold switch means control region is electrically connected, as aforesaid, whereby one of said first and second threshold switch means can be directed, as aforesaid, by occurrences of voltage differences between said first transfer control field-effect device first and second terminating regions of proper polarity and sufficient magnitude.

2. The apparatus of claim 1 wherein said circuit further comprises:

a first discharge control means having first and second terminating regions and having a control region therein by which said first discharge control means is capable of being directed to effectively provide a conductive path of a selected conductivity between said first discharge control means first and second terminating regions, said first discharge control means first terminating region being electrically connected to said first transfer control field-effect device gate region, said first discharge control means second terminating region being electrically connected to said first substrate, and said first discharge control means control region being electrically connected to one of said first threshold switch means first and second terminating regions.

3. The apparatus of claim 1 wherein said circuit further comprises:

a control signal source means having first and second output regions one of which is electrically connected to said first transfer control field-effect device gate region and that other said output region thereof being electrically connected to said first substrate, said control signal source means including first, second, third, and fourth control signal presentation means each having first and second terminating regions and each having a control region therein by which each control signal presentation means is capable of being directed to effectively provide a conductive path of a selected conductivity between said first and second terminating regions thereof, said first control signal presentation means first terminating region being electrically connected to said control signal source means first output region, and said first control signal presentation means second terminating region and control region both being electrically connected to a third terminal means adapted for electrical connection to one of first and second output regions of a control signal generating means capable of providing, if directed to do so, signals between said control signal generating means first and second output regions selected from both constant polarity and alternating polarity signals, said second control signal presentation means first terminating region being electrically connected to said control signal source means first output region, and said second control signal presentation means second terminating region and control region both being electrically connected to a fourth terminal means adapted for electrical connection to that one of said control signal generating means first and second output regions opposite that to which said third terminal means is adapted to be electrically connected, as aforesaid, said third control signal presentation means first terminating region and control region each being electrically connected to a different one of said third and fourth terminal means, and said third control signal presentation means second terminating region being electrically connected to said control signal source means second output region, said fourth control signal presentation means first terminating region and control region each being electrically connected to a different one of said third and fourth terminal means, and said fourth control signal presentation means second terminating region being electrically connected to said control signal source means second output region.

4. The apparatus of claim 1 wherein said circuit further comprises:
an energy storage means having first and second polarity regions between which said energy storage means is capable of providing electrical energy storage, said energy storage means first polarity region being electrically connected to said first substrate;
a first unidirectional current conducting means having therein first and second terminating regions between which an asymmetrical current conducting capability is exhibited, said first unidirectional current conducting means first terminating region being electrically connected to said energy storage means second polarity region, and said first unidirectional current conducting means second terminating region being electrically connected to one of said first and second terminal means; and
a control switch means capable, upon activation, of electrically connecting said first transfer control field-effect device gate region to said first unidirectional current conducting means first terminating region, whereby electrical power can be selectively transferred from said alternating polarity electrical power supply means to said load means in correspondence with said activation of said control switch means.

5. The apparatus of claim 1 wherein said circuit further comprises:
an energy storage means having first and second polarity regions between which said energy storage means is capable of providing electrical energy storage, said energy storage means first polarity region being electrically connected to said first substrate;
a first unidirectional current conducting means having therein first and second terminating regions between which an asymmetrical current conducting capability is exhibited, said first unidirectional current conducting means first terminating region being electrically connected to said energy storage means second polarity region, said first unidirectional current conducting means second terminating region being electrically connected to a third terminal means adapted for electrical connection both said alternating polarity electrical power supply means and said load means; and
a control switch means capable, upon activation, of electrically connecting said first transfer control field-effect device gate region to said first unidirectional current conducting means first terminating region, whereby electrical power can be selectively transferred from said alternating polarity electrical power supply means to said load means in correspondence with said activation of said control switch means.

6. The apparatus of claim 1 wherein said circuit further comprises:
a first parasitic bypass means having first and second terminating regions and having a control region therein by which said first parasitic bypass means is capable of being directed to effectively provide a conductive path of a selected conductivity between said first parasitic bypass means first and second terminating regions, said first parasitic bypass means first terminating region being electrically connected to one of said first transfer control field-effect device first and second terminating regions, and said first parasitic bypass means second terminating region being electrically connected to said first substrate; and
a second parasitic bypass means having first and second terminating regions and having a control region therein by which said second parasitic bypass means is capable of being directed to effectively provide a conductive path of a selected conductivity between said second parasitic bypass means first and second terminating regions, said second parasitic bypass means first terminating regions being electrically connected to one of said first transfer control field-effect device first and second terminating regions opposite that to which said first parasitic bypass means is electrically connected, as aforesaid, and said second parasitic bypass means second terminating region being electrically connected to said first substrate, whereby shunting can be provided between said first substrate and said first transfer control field-effect device first and second terminating regions.

7. The apparatus of claim 1 wherein said circuit further comprises:
a first parasitic bypass means having first and second terminating regions and having a control region therein by which said first parasitic bypass means is capable of being directed to effectively provide a conductive path of a selected conductivity between said first parasitic bypass means first and second terminating regions, said first parasitic bypass means first terminating region being electrically connected to one of said first transfer control field-effect device first and second terminating regions, said first parasitic bypass means second terminating region being electrically connected to said first substrate, and said first parasitic bypass means control region being electrically connected to said first transfer control field-effect device gate region, whereby a path of relatively high conductivity is established between said first parasitic bypass means first and second terminating regions if said first transfer control field-effect device is directed to permit a substantial current flow through said first transfer control field-effect device channel region between said first transfer control field-effect device first and second terminating regions.

8. The apparatus of claim 1 wherein said circuit further comprises:
said first transfer control field-effect device being effectively a field-effect transistor with said first transfer control field-effect device first and second terminating regions being source and drain regions therein;
said first threshold switch means being a field-effect transistor with said first threshold switch means first and second terminating regions being source and drain regions therein separated by channel regions located, at least in part, in a first selected region of a second substrate, and with said first threshold switch means control region being a gate region; and
said second threshold switch means being a field-effect transistor with said second threshold switch means first and second terminating regions being source and drain regions therein separated by a channel region located, at least in part, in a first selected region of a third substrate, and with said second threshold switch means control region being a gate region, where said first, second and third substrates are in common.

9. The apparatus of claim 2 wherein said first threshold switch means first terminating region and said first discharge control means first terminating region are both directly electrically connected to said first transfer control field-effect device gate region, and wherein said first threshold switch means second terminating region and both said first discharge control means second terminating region and control region are directly electrically connected to said first substrate.

10. The apparatus of claim 2 wherein said circuit further comprises:

a first threshold control device having first and second terminating regions having a control region therein by which said first threshold control device is capable of being directed to effectively provide a conductive path of a selected conductivity between said first threshold control device first and second terminating regions, said first threshold control device first terminating region being electrically connected to said first threshold switch means control region, said first threshold control device second terminating region being electrically connected to said first substrate, and said first threshold control device control region being electrically connected to said first transfer control field-effect device gate region;

a second threshold control device having first and second terminating regions and having a control region therein by which said second threshold control device is capable of being directed to effectively provide a conductive path of a selected conductivity between said second threshold control device first and second terminating regions, said second threshold control device first terminating region being electrically connected to said second threshold switch means control region, said second threshold control device second terminating region being electrically connected to said first substrate, and said second threshold control device control region being electrically connected to said first transfer control field-effect device gate region;

a first impedance means having first and second terminating regions between which said first impedance means is capable of providing effectively an electrical impedance to limit a current flowing therethrough in response to a voltage applied thereacross, said first threshold switch means control region being electrically connected to said first transfer control field-effect device, as aforesaid, through said first impedance means such that said first impedance means first terminating region is electrically connected to one of said first transfer control field-effect device first and second terminating regions, and said first impedance means second terminating region is electrically connected to said first threshold switch means control region; and a second impedance means having first and second terminating regions between which said first impedance means is capable of providing effectively an electrical impedance to limit a current flowing therethrough in response to a voltage applied thereacross, said second threshold switch means control region being electrically connected to said first transfer control field-effect device, as aforesaid, through said second impedance means such that said second impedance means first terminating region is electrically connected to that one of said first transfer control field-effect device first and second terminating regions opposite that to which said first threshold switch means is electrically connected, and said second impedance means second terminating regions is electrically connected to said second threshold switch means control region.

11. The apparatus of claim 2 wherein said circuit further comprises:

a first impedance means having first and second terminating regions between which said first impedance means is capable of providing effectively an electrical impedance to limit a current flowing therethrough in response to a voltage applied thereacross, said first threshold switch means first terminating region being electrically connected to said first transfer control field-effect device gate region, as aforesaid, through said first impedance means such that said first impedance means first terminating region is electrically connected to said first transfer control field-effect device gate region, and said first impedance means second terminating region is electrically connected to said first threshold switch means first terminating region; and a second impedance means having first and second terminating regions between which said second impedance means is capable of providing effectively an electrical impedance to limit a current flowing therethrough in response to a voltage applied thereacross, said first discharge control means first terminating region being electrically connected to said first transfer control field-effect device gate region, as aforesaid, through said second impedance means such that said second impedance means first terminating region is electrically connected to said first transfer control field-effect device gate region, and said second impedance means second terminating region is electrically connected to said first discharge control means first terminating region.

12. The apparatus of claim 2 wherein said circuit further comprises:

said first transfer control field-effect device being effectively a field-effect transistor with said first transfer control field-effect device first and second terminating region being source and drain regions therein;

said first threshold switch means being a field-effect transistor with said first threshold switch means first and second terminating regions being source and drain regions therein separated by a channel region located, at least in part, in a first selected region of a second substrate, and with said first threshold switch means control region being a gate region;

said second threshold switch means being a field-effect transistor with said second threshold switch means first and second terminating regions being source and drain regions therein separated by a channel region located, at least in part, in a first selected region of a third substrate, and with said second threshold switch means control region being a gate region; and said first discharge control means being a field-effect transistor with said first discharge control means first and second terminating regions being source and drain regions therein separated by a channel region located, at least in part, in a first selected region of a fourth substrate, and with said first discharge control means control region being a gate region.

13. The apparatus of claim 3 wherein said circuit further comprises:
said first transfer control field-effect device being effectively a field-effect transistor with said first transfer control field-effect device first and second terminating regions being source and drain regions therein;
said first control signal presentation means being a field-effect transistor with said first control signal presentation means first and second terminating regions being source and drain regions therein separated by a channel region located, at least in part, in a first selected region of a second substrate, and with said first control signal presentation means control region being a gate region;
said second control signal presentation means being a field-effect transistor with said second control signal presentation means first and second terminating regions being source and drain regions therein separated by a channel region located, at least in part, in a first selected region of a third substrate, and with said second control signal presentation means control region being a gate region;
said third control signal presentation means being a field-effect transistor with said third control signal presentation means first and second terminating regions being source and drain regions therein separated by a channel region located, at least in part, in a first selected region of a fourth substrate, and with said third control signal presentation means control region being a gate region;
said fourth control signal presentation means being a field-effect transistor with said fourth control signal presentation means first and second terminating regions being source and drain regions therein separated by a channel region located, at least in part, in a first selected region of a fifth substrate, and with said fourth control signal presentation means control region being a gate region.

14. The apparatus of claim 6 wherein said first parasitic bypass means control region is electrically connected to said second parasitic bypass means first terminating region and said second parasitic bypass means control region is electrically connected to said first parasitic bypass means first terminating region.

15. The apparatus of claim 7 wherein said first transfer control field-effect device gate region and said first parasitic bypass means control region are directly electrically connected to one another.

16. The apparatus of claim 8 wherein said circuit further comprises:
said first transfer control field-effect device being effectively an enhancement mode, insulated-gate, field-effect transistor (IGFET) with said first transfer control field-effect device gate region being separated from said first selected region of said first substrate by an insulating layer;
said first threshold switch means being an enhancement mode, insulated-gate, field-effect transistor (IGFET) with said first threshold switch means gate region being separated from said first selected region of said second substrate by an insulating layer; and
said second threshold switch means being an enhancement mode, insulated-gate, field-effect transistor (IGFET) with said second threshold switch means gate region being separated from said first selected region of said third substrate by an insulating layer.

17. The apparatus of claim 9 wherein said circuit further comprises:
a first threshold control device having first and second terminating regions and having a control region therein by which said first threshold control device is capable of being directed to effectively provide a conductive path of a selected conductivity between said first threshold control device first and second terminating regions, said first threshold control device first terminating region being electrically connected to said first threshold switch means control region, said first threshold control device second terminating region being electrically connected to said first substrate, and said first threshold control device control region being electrically connected to said first transfer control field-effect device gate region;
a second threshold control device having first and second terminating regions and having a control region therein by which said second threshold control device is capable of being directed to effectively provide a conductive path of a selected conductivity between said second threshold control device first and second terminating regions, said second threshold control device first terminating region being electrically connected to said second threshold switch means control region, said second threshold control device second terminating region being electrically connected to said first substrate, and said second threshold control device control region being electrically connected to said first transfer control field-effect device gate region;
a first impedance means having first and second terminating regions between which said first impedance means is capable of providing effectively an electrical impedance to limit a current flowing therethrough in response to a voltage applied thereacross, said first threshold switch means control region being electrically connected to said first transfer control field-effect device, as aforesaid, through said first impedance means such that said first impedance means first terminating region is electrically connected to one of said first transfer control field-effect device first and second terminating regions, and said first impedance means second terminating region is electrically connected to said first threshold switch means control region; and
a second impedance means having first and second terminating regions between which said first impedance means is capable of providing effectively an electrical impedance to limit a current flowing therethrough in response to a voltage applied thereacross, said second threshold switch means control region being electrically connected to said first transfer control field-effect device, as aforesaid, through said second impedance means such that said second impedance means first terminating region is electrically connected to that one of said first transfer control field-effect device first and second terminating regions opposite that to which said first threshold switch means electrically connected, and said second impedance means second terminating regions is electrically connected to said second threshold switch means control region.

18. The apparatus of claim 11 wherein said circuit further comprises:

a control signal source means having first and second output regions one of which is electrically connected to said first transfer control field-effect device gate region and that other said output region thereof being electrically connected to said first substrate, said control signal source means including first, second, third, and fourth control signal presentation means each having first and second terminating regions and each having a control region therein by which each control signal presentation means is capable of being directed to effectively provide a conductive path of a selected conductivity between said first and second terminating regions thereof, said first control signal presentation means first terminating region being electrically connected to said control signal source means first output region, and said first control signal presentation means second terminating region and control region both being electrically connected to a third terminal means adapted for electrical connection to one of first and second output regions of a control signal generating means capable of providing, if directed to do so, signals between said control signal generating means first and second output regions selected from both constant polarity and alternating polarity signals, said second control signal presentation means first terminating region being electrically connected to said control signal source means first output region, and said second control signal presentation means second terminating region and control region both being electrically connected to a fourth terminal means adapted for electrical connection to that one of said control signal generating means first and second output regions opposite that to which said third terminal means is adapted to be electrically connected, as aforesaid, said third control signal presentation means first terminating region and control region each being electrically connected to a different one of said third and fourth terminal means, and said third control signal presentation means second terminating region being electrically connected to said control signal source means second output region, said fourth control signal presentation means first terminating region and control region each being electrically connected to a different one of said third and fourth terminal means, and said fourth control signal presentation means second terminating region being electrically connected to said control signal source means second output region.

19. The apparatus of claim 12 wherein said circuit further comprises:

said first transfer control field-effect device being effectively an enhancement mode, insulated-gate, field-effect transistor (IGFET) with said first transfer control field-effect device gate region being separated from said first selected region of said first substrate by an insulating layer;

said first threshold switch means being an enhancement mode, insulated-gate, field-effect transistor (IGFET) with said first threshold switch means gate region being separated from said first selected region of said second substrate by an insulating layer;

said second threshold switch means being an enhancement mode, insulated-gate, field-effect transistor (IGFET) with said second threshold switch means gate region being separated from said first selected region of said third substrate by an insulating layer; and said first discharge control means being an enhancement mode, insulated-gate, field-effect transistor (IGFET) with said first discharge control means gate region being separated from said first selected region of said fourth substrate by an insulating layer, where said first, second, third, and fourth substrates are in common.

20. The apparatus of claim 12 wherein said circuit further comprises:

said first transfer control field-effect device being effectively an enhancement mode, insulated-gate, field-effect transistor (IGFET) with said first transfer control field-effect device gate region being separated from said first selected region of said first substrate by an insulating layer;

said first threshold switch means being an enhancement mode, insulated-gate, field-effect transistor (IGFET) with said first threshold switch means gate region being separated from said first selected region of said second substrate by an insulating layer;

said second threshold switch means being an enhancement mode, insulated-gate, field-effect transistor (IGFET) with said second threshold switch means gate region being separated from said first selected region of said third substrate by an insulating layer; and said first discharge control means being a depletion mode, insulated-gate, field-effect transistor (IGFET) with said first discharge control means gate region being separated from said first selected region of said fourth substrate by an insulating layer, where said first, second, third, and fourth substrates are in common.

21. The apparatus of claim 17 wherein said circuit further comprises:

a control signal source means having first and second output regions one of which is electrically connected to said first transfer control field-effect device gate region and that other said output region thereof being electrically connected to said first substrate, said control signal source means including first, second, third, and fourth control signal presentation means each having first and second terminating regions and each having a control region therein by which each control signal presentation means is capable of being directed to effectively provide a conductive path of a selected conductivity between said first and second terminating regions thereof, said first control signal presentation means first terminating region being electrically connected to said control signal source means first output region, and said first control signal presentation means second terminating region and control region both being electrically connected to a third terminal means adapted for electrical connection to one of first and second output regions of a control signal generating means capable of providing, if directed to do so, signals between said control signal generating means first and second output regions selected from both constant polarity and alternating polarity signals, said second control signal presentation means first terminating region being electrically connected to said control signal source means first output region, and said second control signal presentation means second terminating region and control region both being electrically connected to a fourth terminal means adapted for electrical connection to that one of said control signal generating means first and second output regions opposite that to which said third terminal means is adapted to be electrically connected, as aforesaid, said third control signal presentation means first terminating region and control region each being electrically connected to a different one of said third and fourth terminal means, and said third control signal presentation means second terminating region being electrically connected to said control signal source means second output region, said fourth control signal presentation means first terminating region and control region each being electrically connected to a different one of said third and fourth terminal means, and said fourth control signal presentation means second terminating region being electrically connected to said control signal source means second output region.

22. The apparatus of claim 17 wherein said circuit further comprises:

said first transfer control field-effect device being effectively a field-effect transistor with said first transfer control field-effect device first and second terminating region being source and drain regions therein;

said first threshold switch means being a field-effect transistor with said first threshold switch means first and second terminating regions being source and drain regions therein separated by a channel region located, at least in part, in a first selected region of a second substrate, and with said first threshold switch means control region being a gate region;

said second threshold switch means being a field-effect transistor with said second threshold switch means first and second terminating regions being source and drain regions therein separated by a channel region located, at least in part, in a first selected region of a third substrate, and with said second threshold switch means control region being a gate region;

said first discharge control means being a field-effect transistor with said first discharge control means first and second terminating regions being source and drain regions therein separated by a channel region located, at least in part, in a first selected region of a fourth substrate, and with said first discharge control means control region being a gate region;

said first threshold control device being a field-effect transistor with said first threshold control device first and second terminating regions being source and drain regions therein separated by a channel region located, at least in part, in a first selected region of a fifth substrate, and with said first threshold control device control region being a gate region; and said second threshold control device being a field-effect transistor with said second threshold control device first and second terminating regions being source and drain regions therein separated by a channel region located, at least in part, in a first selected region of a sixth substrate, and with said second threshold control device control region being a gate region.

23. The apparatus of claim 22 wherein said circuit further comprises:

said first transfer control field-effect device being effectively an enhancement mode, insulated-gate, field-effect transistor (IGFET) with said first transfer control field-effect device gate region being separated from said first selected region of said first substrate by an insulating layer;

said first threshold switch means being an enhancement mode, insulated-gate, field-effect transistor (IGFET) with said first threshold switch means gate region being separated from said first selected region of said second substrate by an insulating layer;

said second threshold switch means being an enhancement mode, insulated-gate, field-effect transistor (IGFET) with said second threshold switch means gate region being separated from said first selected region of said third substrate by an insulating layer;

said first discharge control means being a depletion mode, insulated-gate, field-effect transistor (IGFET) with said first discharge control means gate region being separated from said first selected region of said fourth substrate by an insulating layer;

said first threshold control device being an enhancement mode, insulated-gate, field-effect transistor (IGFET) with said first threshold control device gate region being separated from said first selected region of said fifth substrate by an insulating layer;

said second threshold control device being an enhancement mode, insulated-gate, field-effect transistor (IGFET) with said second threshold control device gate region being separated from said first selected region of said sixth substrate by an insulating layer;

said first impedance means being a depletion mode, insulated-gate, field-effect transistor (IGFET) with said first impedance means first and second terminating regions being source and drain regions therein separated by a channel region located, at least in part, in a first selected region of a seventh substrate and having a gate region separated from said first selected region of said seventh substrate by an insulating layer, said first impedance gate region being electrically connected to said first impedance means source region; and said second impedance means being a depletion mode, insulated-gate, field-effect transistor (IGFET) with said second impedance means first and second terminating regions being source and drain regions therein separated by a channel region located, at least in part, in a first selected region of an eighth substrate and having a gate region separated from said first selected region of said eighth substrate by an insulating layer, said second impedance gate region being electrically connected to said second impedance means source region, where said first, second, third, fourth, fifth, sixth, seventh, and eighth substrates are in common.

* * * * *